United States Patent Office 2,952,680
Patented Sept. 13, 1960

2,952,680

DERIVATIVES OF 4-QUINAZOLONE

Frederick C. Novello, Lansdale, Pa., assignor to Merck & Co., Inc., Rahway, N.J., a corporation of New Jersey No Drawing. Filed Jan. 22, 1958, Ser. No. 710,386

5 Claims. (Cl. 260—256.5)

This invention is concerned with novel 4-quinazolone compounds which contain a sulfamyl substituent in the benzenoid portion of the nucleus. The structural formula of the new compounds of this invention is illustrated below. In those compounds having no substituent other than hydrogen on either nitrogen in the 4-quinazolone nucleus, tautomerism permits the structure of the compounds to be as illustrated below by structures A, B, and C. When substitution other than hydrogen occurs on the $N^1$ nitrogen, the double bond is fixed between the 2- and 3-position atoms as illustrated by structure A, and when substitution other than hydrogen occurs on the $N^3$ atom, the double bond is fixed between the 1- and 2-position atoms as illustrated by structure B. Thus, in general, the compounds can be considered having one of the general structures, A, B, or C:

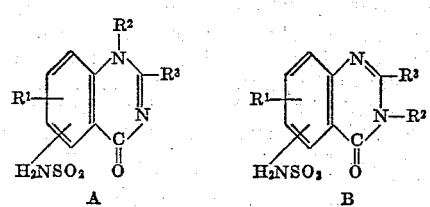

and

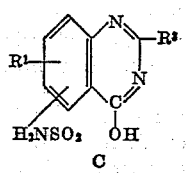

The novel 4-quinazolone compounds of this invention therefore comprise compounds having the general structures illustrated above and include their non-toxic alkali metal salts and alkaline earth metal salts, wherein $R^1$ is hydrogen, a halogen such as chlorine, bromine, fluorine, and the like, a lower alkyl radical advantageously having from 1 to 5 carbon atoms, a lower alkoxy radical also advantageously having from 1 to 5 carbon atoms in the alkyl portion of the radical, or a nitro or an amino group; $R^2$ is hydrogen or a lower alkyl radical having advantageously from 1 to 5 carbon atoms; and $R^3$ represents hydrogen, a lower alkyl radical having from 1 to 11 carbon atoms, a mononuclear aryl radical or a mononuclear aryl-lower alkyl radical, the alkyl portion of which has preferably from 1 to 3 carbon atoms.

The novel compounds of the invention are useful pharmacotherapeutic agents particularly because of their diuretic, natriuretic and/or saluretic properties (hereinafter referred to as diuretic properties). They can be administered in therapeutic dosages in conventional vehicles as in the form of tablets, pills, capsules, and the like as these compounds are effective upon oral administration. As the compounds of this invention also are soluble in a dilute alkaline medium or in polyethylene glycol, injectable solutions can be prepared for parenteral administration by dissolving the compound in the selected medium to which preservatives can be added if desired.

Dosages between about 5 to about 10 mg./kg./day generally are suitable to produce a diuretic response. Of course, more or less of the active ingredient can be employed depending upon the age and condition of the individual who is to receive the compound and for this reason scored tablets comprising 0.5 g. of active ingredient or more can be supplied to the physician for the symptomatic adjustment of dosage to the individual patient. These recommended dosages appear to be well below the toxic dose of the compounds as evidenced by the fact that acute intravenous $LD_{50}$ in mice of one of the compounds falling within the scope of this invention, that is 7-chloro-6-sulfamyl-4-quinazolone, was found to be 445 mg./kg. and no toxic reactions were observed when this compound was administered to dogs, intravenously, at dosages up to 15 mg./kg.

The diuretic properties of the novel compounds of this invention make them particularly useful in the treatment of congestive heart failure and other pathological conditions which produce an edematous condition in the body or which produce an imbalance in the electrolyte concentration in the body, as, for example, those in which an abnormal retention of sodium occurs.

The novel 4-quinazolones of this invention can be prepared by one or more of the methods illustrated below:

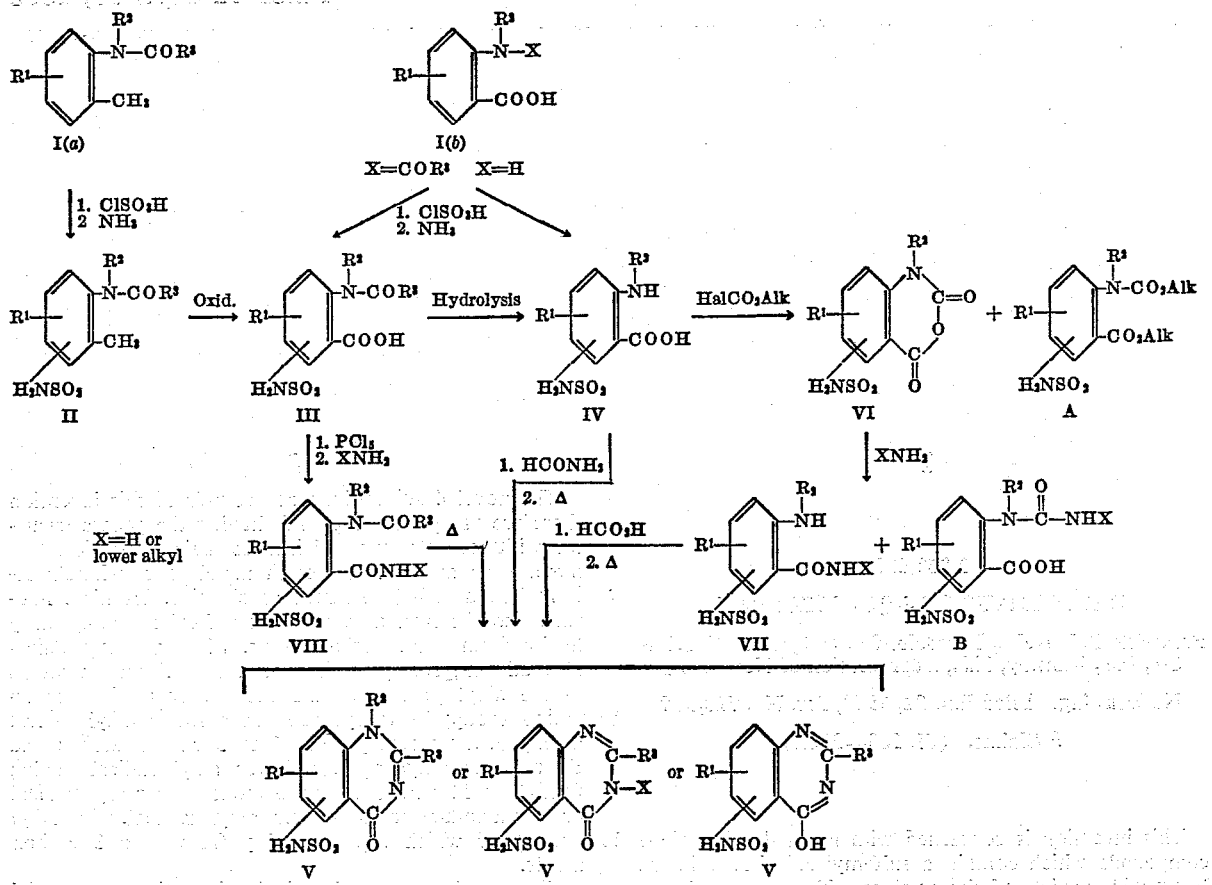

The intermediate compound, III, can be prepared either from a 2-methylacylanilide I(a) or from the anthranilic acid, I(b) wherein one or the other of these starting materials is a known compound. Either of these synthetic routes can be employed in substantially every case except wherein $R^1$ is a methyl radical in which event it is preferred to employ starting material I(b) in order to avoid oxidizing the methyl radical when converting compound II to compound III.

As can be seen from the above reaction schemes, the preparation of the 4-quinazolone compound, V, wherein $R^3$ is hydrogen, is best accomplished by hydrolyzing compound III to remove the N-acyl group thus forming compound IV which then is reacted with formamide with heating to form the 4-quinazolone compound, V.

However, when it is desired that $R^3$ be a substituent other than hydrogen, then the preferred method involves converting compound III to the corresponding anthranilic acid chloride which then is converted to the amide VIII by treatment with ammonia or a primary amine. Compound VIII then is heated to form a 4-quinazolone, V, wherein $R^3$ can be a substituent other than hydrogen. When the intermediate anthranilic acid chloride is treated with an alkylamine and then heated, substitution thus can be effected in each of the 2- and 3-positions of the 4-quinazolone nucleus.

When it is desired to have a substituent other than hydrogen attached to the 3-position of the quinazolone nucleus, then the preferred reaction route is from compound III through compounds IV, VI, and VII to form a 4-quinazolone having a substituent other than hydrogen attached to the 3-position nitrogen.

The conversion of the 2-methylaniline, compound I(a), to the 2-methylsulfamylaniline, compound II, is accomplished by first chlorosulfonating compound I(a) with chlorosulfonic acid advantageously employing an excess of a molar equivalent of chlorosulfonic acid and preferably heating the reaction mixture at between about 60–100° C. The sulfonyl chloride derivative of I(a) then is treated with ammonia, preferably between about 0° C. to room temperature, and then heating the reaction mixture advantageously on the steam bath thus forming the 2-methyl-4-sulfamylaniline, compound II.

The ammonia used in the amidation step is employed in excess of that required to convert the sulfonyl chloride group to the sulfamyl group and preferably at least two molar equivalents of ammonia are used. Ammonia can be added in the form of aqueous or alcoholic ammonium hydroxide, liquid ammonia, or by dissolving the sulfonyl chloride in an organic solvent and bubbling ammonia gas into the solution to form the sulfamyl derivative.

The 2-methyl group of the 2-methyl-4-sulfamylaniline compound, II, then is oxidized to the carboxyl group preferably by heating at about 100° C. a reaction mixture containing compound II, potassium permanganate and magnesium sulfate. The reaction mixture preferably is maintained at a neutral pH to avoid the removal of the N-acyl radical, and the reaction is continued until the characteristic color of the permanganate disappears.

As mentioned above, the reactions described above for the conversion of compound I(a) to compound III can be employed with any of the intermediates needed to prepare the 4-quinavolones of this invention; although when $R^1$ represents a methyl radical it is preferable to employ a starting material of the type represented by structure I(b). In those instances where the N-acyl derivative of either compound I(a) or I(b) is not readily available, it can be prepared from the appropriate aniline compound by known acylation procedures.

Any of the 4-quinazolone compounds of this invention, and particularly those wherein $R^1$ is the methyl group, can be prepared from the N-acylanthranilic acids I(b).

The chlorosulfonation and amidation of compound I(b) to form compounds III or IV is carried out in substantially the same manner described above for the conversion of the 2-methylaniline compound, I(a), to the 2-methylsulfamylaniline compound II.

Compound III then can be converted to the desired quinazolone by any one of the methods described and illustrated above. When it is desired to prepare a 4-quinazolone, V, wherein $R^3$ is hydrogen, compound III is hydrolyzed to remove the N-acyl radical thus forming compound IV. Hydrolysis can be effected in any of the usual ways such as by heating on the steam bath in the presence of hydrochloric acid or refluxing a mixture of compound III, alcohol and concentrated hydrochloric acid. Compound IV then is heated at between about 120–175° C. with formamide to form the desired 4-quinazolone, compound V, wherein $R^3$ is hydrogen.

The preparation of 4-quinazolone, V, which can have a substituent of the type defined for $R^2$ above attached to the 3-position of the nucleus, is accomplished by heating the 2-carboxy-sulfamyl aniline compound, IV, with a lower alkyl halocarbonate to form the sulfamyl-isatoic anhydride, VI, and (2-carbalkoxy-sulfamylphenyl)alkyl-carbamate, A. Compounds VI and A can be separated by taking advantage of their different solubilities in dioxane. The sulfamyl-isatoic anhydride, VI, which is insoluble in dioxane, then is separated and when $R^2$ in structure VI is hydrogen or a lower alkyl the isatoic anhydride can be reacted with ammonia to form compound VII wherein X is hydrogen; and when $R^2$ is hydrogen the isatoic anhydride can be reacted with a primary amine to form compound VII wherein X is a lower alkyl. In each instance a (2-carboxy-sulfamylphenyl)urea, B, is formed as a byproduct. Compound VII and compound B can be separated by virtue of their different solubilities in aqueous ammonia. Compound VII, which is insoluble in aqueous ammonia, can be cyclized to form the 4-quinazolone, compound V, by heating with formic acid or with ethyl orthoformate.

The ammonia used in the reaction with the sulfamyl-isatoic anhydride can be in any form, such as aqueous or alcoholic ammonium hydroxide, liquid ammonia or ammonia gas. At least two equivalents of ammonia or the primary amine can be used, although in practice an excess generally is employed as the excess will not interfere with the reaction and the cost is not significant. Reaction will occur at room or slightly elevated temperatures.

The carbamyl derivative, VII, can be treated with formic acid or ethyl orthoformate either with or without a solvent such as diethyleneglycol and then heated at between about 100–150° C. thus forming the 4-quinazolone compound, V, wherein, if a lower alkylamine had been employed, a lower alkyl substituent will be attached to the 3-position of the 4-quinazolone nucleus.

The 4-quinazolone compounds wherein a substituent other than hydrogen can be attached to the 2-position, or wherein substituents other than hydrogen can be attached to each of the 2- and the 3-positions of the quinazolone nucleus are prepared by converting the 2-carboxy-sulfamyl-acylanilide, compound III, to the acid chloride with a chlorinating agent selected from phosphorus pentachloride, phosphorus trichloride, thionylchloride, sulfuryl chloride, and the like, advantageously at room temperature or at slightly elevated temperatures. The reaction carries through in the presence of a solvent such as benzene, toluene, dioxane and the like, and the anthranilic acid chloride thus obtained then is treated with ammonia or a primary amine to form the carbamyl derivative, VIII. Ammonia in substantially any form can be employed in the reaction, such as aqueous or alcoholic ammonium hydroxide, liquid ammonia or ammonia gas either with or without a solvent and advantageously at room temperature. When a primary amine is employed, reaction preferably is conducted in the presence of a solvent and either at room or at slightly elevated temperatures. Whether ammonia or a primary amine is used to form the carbamyl derivative VIII, at least two equivalents are used, although an excess of two equivalents can, and usually is employed without interfering in any way with the successful amidation of the anthranilic acid chloride.

The carbamyl compound, VIII, then is cyclized by heating it at between about 150–250° C. for 1–5 hours to form the 4-quinazolone compound V having the desired substituents in the 2- and 3-positions of the nucleus. Ring closure of the carbamyl compound, VIII, can be effected either by fusion or by heating with aqueous or alcoholic alkali.

The alkali metal salts of the 4-quinazolone compounds of this invention can be prepared by any of the conventional methods such as by dissolving the selected quinazolone compound in an aqueous or alcoholic solution of the alkali metal hydroxide, and, if desired, isolating the salt by evaporating the solvent. Any of the conventional alkali metal salts, such as the sodium, potassium, lithium, or the like salts, can be prepared by this method or by other methods known to organic chemists. The alkaline earth metal salts are prepared by replacement of the alkali metal by an alkaline earth metal by well known procedures.

While the above discussion outlines general methods suitable for the preparation of the 4-quinazolone compounds of this invention, other methods can, of course, be employed. Also, modifications can be made in the procedural steps described above to improve the conditions for the preparation of any particular compound it is desired to prepare. It is to be understood, therefore, that the following examples, which more fully describe the preparation of the compounds of this invention, are illustrative of the methods which can be employed for the preparation of the novel compounds of this invention and are not to be construed as limiting the invention to the particular methods or the particular compounds specifically described.

EXAMPLE 1

*7-chloro-6-sulfamyl-4-quinazolone*

Step A.—A solution of 18 g. of 5-chloro-2-methylacetanilide in 50 ml. of chlorosulfonic acid is heated on the steam bath for 45 minutes, cooled, and poured onto ice. The solid is collected on a filter and transferred to a beaker. Ammonium hydroxide (50 ml.) is added and the mixture heated on the steam bath for 1 hour and then cooled in an ice bath. The solid is collected and recrystallized from a 50% alcohol-water mixture to give 5-chloro-2-methyl-4-sulfamylacetanilide, M.P. 262–263° C.

Analysis.—Calculated for $C_9H_{11}ClN_2O_3S$: C, 41.14; H, 4.22; N, 10.66. Found: C, 41.16; H, 4.41; N, 10.66.

Step B.—A mixture of 31.5 g. of the thus obtained compound, 37.2 g. of magnesium sulfate, and 52.8 g. of potassium permanganate in 2,800 ml. of water is heated under reflux with stirring for 5 hours. Sodium carbonate (51 g.) is added portionwise with caution and the solution filtered through a layer of charcoal. The filtrate is cooled in an ice bath and acidified with hydrochloric acid. The precipitate is collected on the filter and recrystallized from alcohol-water yielding 2-carboxy-5-chloro-4-sulfamylacetanilide, M.P. 269–270° C. (dec.).

Analysis.—Calculated for $C_9H_9ClN_2O_5S$: C, 36.93; H, 3.10; N, 9.57. Found: C, 37.17; H, 3.25; N, 9.56.

Step C.—A suspension of 10 g. of the thus obtained compound in a mixture of 100 ml. of concentrated hydrochloric acid and 40 ml. of ethanol is heated under reflux for 10–15 minutes. The solution is diluted with water (50 ml.) and cooled in an ice bath. The crystalline precipitate is collected on the filter and recrystallized from alcohol-water yielding 2 - carboxy - 5 - chloro - 4-sulfamylaniline, M.P. 267° C. (dec.).

Analysis.—Calculated for $C_7H_7ClN_2O_4S$: C, 33.54; H, 2.82; N, 11.18. Found: C, 33.89; H, 3.15; N, 11.15.

Step D.—A mixture of 5 g. of the thus obtained product and 5 g. of formamide is heated at 130–140° C. for 3 hours, cooled, and diluted with 25 ml. of water. The precipitate is collected and recrystallized from alcohol-water yielding 7-chloro-6-sulfamyl-4-quinazolone, M.P. 314–315° C. (dec.).

*Analysis.*—Calculated for $C_8H_6ClN_3O_3S$: C, 37.00; H, 2.33; N, 16.18. Found: C, 37.26; H, 2.36; N, 16.18.

EXAMPLE 2

*7-chloro-3-ethyl-2-methyl-6-sulfamyl-4-quinazolone*

*Step A.*—A suspension of 30 g. of 2-carboxy-5-chloro-4-sulfamylacetanilide (prepared as described in Example 1, Steps A and B) and 21 g. of phosphorus pentachloride in 300 ml. of benzene is stirred at room temperature for 1–2 hours. The mixture is filtered and the precipitate washed with 100 ml. of hot benzene. To the combined benzene extracts, cooled in an ice bath, a solution of 25 g. of ethylamine in 100 ml. of anhydrous ether is added with stirring over 30 minutes. After one hour at room temperature, the solvent is removed in vacuo and the residue washed with water and crystallized from aqueous alcohol to give 2-N-ethylcarbamyl-5-chloro-4-sulfamyl-acetanilide.

*Step B.*—The thus obtained 2-N-ethylcarbamyl-5-chloro-4-sulfamyl-acetanilide, 5 g., is heated at 200–250° C. for 2 hours, cooled, and the residue crystallized from aqueous alcohol yielding 7-chloro-3-ethyl-2-methyl-6-sulfamyl-4-quinazolone.

EXAMPLE 3

*7-chloro-1-methyl-6-sulfamyl-4-quinazolone*

*Step A.*—By replacing the 5-chloro-2-methylacetanilide employed in Example 1, Step A, by an equimolecular quantity of 2-carboxy-5-chloro-N-methylaniline and following substantially the same procedure described in Example 1, Step A, there is obtained 2-carboxy-5-chloro-4-sulfamyl-N-methylaniline.

*Step B.*—By replacing the 2-carboxy-5-chloro-4-sulfamylaniline employed in Example 1, Step D, by an equimolecular quantity of the product obtained in Step A above, and following substantially the same procedure as described in Example 1, Step D, there is obtained 7-chloro-1-methyl-6-sulfamyl-4-quinazolone.

EXAMPLE 4

*7-methoxy-6-sulfamyl-4-quinazolone*

*Step A.*—By replacing 5-chloro-2-methylacetanilide employed in Example 1, Step A, by an equimolecular quantity of 2-carboxy-5-methoxyaniline and following substantially the same procedure described in Example 1, Step A, there is obtained 2-carboxy-5-methoxy-4-sulfamylaniline.

*Step B.*—By replacing the 2-carboxy-5-chloro-4-sulfamylaniline employed in Example 1, Step D, by an equimolecular quantity of the product obtained in Step A above, and following substantially the same procedure as described in Example 1, Step D, there is obtained 7-methoxy-6-sulfamyl-4-quinazolone.

EXAMPLE 5

*1,2-dimethyl-7-methoxy-6-sulfamyl-4-quinazolone*

*Step A.*—2-carboxy-5-methoxy-N-methylaniline (1 mole) is added portionwise over a period of 10–15 minutes to acetic anhydride (1.5 mole), cooled in an ice bath. After standing at room temperature for 1–2 hours, the mixture is heated on the steam bath for 30 minutes and then cooled in an ice bath. Cold water (1 liter) is added and the product taken up in ether, washed with water, dried over sodium sulfate and evaporated to dryness on the steam bath yielding 2-carboxy-5-methoxy-N-methylacetanilide.

*Step B.*—By replacing the 5-chloro-2-methylacetanilide employed in Example 1, Step A, by an equimolecular quantity of the product obtained in Step A above, and following substantially the same procedure described in Example 1, Step A, there is obtained 2-carboxy-5-methoxy-4-sulfamyl-N-methylacetanilide.

*Step C.*—By replacing the 2-carboxy-5-chloro-4-sulfamylacetanilide employed in Step A, of Example 2, by an equimolecular quantity of the 2-carboxy-5-methoxy-4-sulfamyl-N-methylacetanilide obtained as described in Step B above, and following substantially the same procedures described in Steps A through C of Example 2, there is obtained 1,2-dimethyl-7-methoxy-6-sulfamyl-4-quinazolone.

EXAMPLE 6

*7-nitro-6-sulfamyl-4-quinazolone*

*Step A.*—By replacing the 5-chloro-2-methylacetanilide employed in Example 1, Step A, by an equimolecular quantity of 2-carboxy-5-nitroaniline and following substantially the same procedure described in Example 1, Step A, there is obtained 2-carboxy-5-nitro-4-sulfamylaniline.

*Step B.*—By replacing the 2-carboxy-5-chloro-4-sulfamylaniline employed in Example 1, Step D, by an equimolecular quantity of the product obtained in Step A above, and following substantially the same procedure described in Example 1, Step D, there is obtained 7-nitro-6-sulfamyl-4-quinazolone.

EXAMPLE 7

*7-amino-6-sulfamyl-4-quinazolone*

A solution of 3.0 g. of the 7-nitro-6-sulfamyl-4-quinazolone obtained as described in Example 6, in 600 ml. of a 50% alcohol-water mixture is shaken in an atmosphere of hydrogen with 400 mg. of platinum oxide catalyst until hydrogen absorption ceases. The catalyst is removed by filtration and the solution concentrated to dryness in vacuo. Crystallization of the residue from a 50% alcohol-water mixture yields 7-amino-6-sulfamyl-4-quinazolone.

EXAMPLE 8

*1-methyl-7-nitro-6-sulfamyl-4-quinazolone*

By replacing the 5-chloro-2-methylacetanilide employed in Example 1, Step A, by an equimolecular quantity of 2-methyl-5-nitro-N-methylacetanilide and following substantially the same procedures described in Example 1, Steps A and B, there is obtained 2-carboxy-5-nitro-4-sulfamyl-N-methylacetanilide. This product then is hydrolyzed by substantially the same procedure described in Example 1, Step C, to form 2-carboxy-5-nitro-4-sulfamyl-N-methylaniline which product then is treated with formamide and heated by substantially the same procedure described in Example 1, Step D, to form 1-methyl-7-nitro-6-sulfamyl-4-quinazolone.

EXAMPLE 9

*7-amino-1-methyl-6-sulfamyl-4-quinazolone*

By replacing the 7-nitro-6-sulfamyl-4-quinazolone employed in Example 7 by an equimolecular quantity of 1-methyl-7-nitro-6-sulfamyl-4-quinazolone obtained as described in Example 8, and following substantially the same procedure described in Example 7, there is obtained 7-amino-1-methyl-6-sulfamyl-4-quinazolone.

EXAMPLE 10

*6-sulfamyl-4-quinazolone*

By replacing the 5-chloro-2-methylacetanilide employed in Example 1, Step A, by an equimolecular quantity of 2-methylacetanilide and following substantially the same procedures described in Example 1, Steps A and B, there is obtained 2-carboxy-4-sulfamylacetanilide. The product thus obtained then is hydrolyzed by substantially the same procedure described in Example 1, Step C, to form 2-carboxy-4-sulfamylaniline which then is treated with formamide and heated by substantially the same procedure described in Example 1, Step D, to form 6-sulfamyl-4-quinazolone.

EXAMPLE 11

7-methyl-6-sulfamyl-4-quinazolone

By replacing the 5-chloro-2-methylacetanilide employed in Example 1, Step A, by an equimolecular quantity of 2-carboxy-5-methylaniline and following substantially the same procedure described in Example 1, Step A, there is obtained 2-carboxy-5-methyl-4-sulfamylaniline. The product thus obtained then is treated with formamide and heated by substantially the same procedure described in Example 1, Step D, to form 7-methyl-6-sulfamyl-4-quinazolone.

EXAMPLE 12

7-propyl-6-sulfamyl-4-quinazolone

*Step A.*—2-methyl-5-propylaniline (1 mole) is added portionwise over a period of 10–15 minutes to acetic anhydride (1.5 moles) cooled in an ice bath. After standing at room temperature for 1–2 hours, the mixture is heated on the steam bath for 30 minutes and then cooled in an ice bath. Cold water (1 liter) is added and the product taken up in ether, washed with water, dried over sodium sulfate and evaporated to dryness on the steam bath to give 2-methyl-5-propylacetanilide.

*Step B.*—By replacing the 5-chloro-2-methylacetanilide employed in Example 1, Step A, by an equimolecular quantity of the product obtained as described in Step A above, and following substantially the same procedures described in Steps A and B of Example 1, there is obtained 2-carboxy-5-propyl-4-sulfamylacetanilide. This product then is hydrolyzed by substantially the same procedure described in Example 1, Step C, to form the corresponding 2-carboxy-5-propyl-4-sulfamlyaniline which then is treated with formamide and heated by substantially the same procedure described in Example 1, Step D, to form 7-propyl-6-sulfamyl-4-quinazolone.

EXAMPLE 13

7-propoxy-6-sulfamyl-4-quinazolone

*Step A.*—To a solution of 165 g. of 2-methyl-5-hydroxyacetanilide in an ethanolic solution of sodium ethoxide prepared from 27.6 g. of sodium and 600 ml. of anhydrous ethanol, propylbromide (164 g.) is added dropwise over a 30 minute period. After standing at room temperature for 2 hours, the mixture is heated on the steam bath for 5 hours, cooled, filtered, and concentrated to dryness in vacuo. Crystallization of the product thus obtained from dilute alcohol gives 2-methyl-5-propoxyacetanilide.

*Step B.*—By replacing the 5-chloro-2-methylacetanilide employed in Example 1, Step A, by an equimolecular quantity of the thus obtained 2-methyl-5-propoxyacetanilide, and following substantially the same procedures described in Example 1, Steps A and B, there is obtained 2-carboxy-5-propoxy-4-sulfamylacetanilide. The acetanilide thus obtained then is hydrolyzed by substantially the same procedure described in Example 1, step C, to the corresponding 2 - carboxy - 5 - propoxy-4-sulfamylaniline which then is treated with formamide and heated by substantially the same procedure described in Example 1, Step D, to form 7-propoxy-6-sulfamyl-4-quinazolone.

EXAMPLE 14

7-chloro-1-propyl-6-sulfamyl-4-quinazolone

*Step A.*—To a mixture of 132 g. (1.0 mole) of 5-chloro-2-methylaniline and 1 liter of water containing 100 g. of sodium hydroxide cooled in an ice bath, benzenesulfonyl chloride (207 g.) is added with stirring over a 30 minute period. After stirring at room temperature for an additional 2 hours, the precipitate, consisting of the sodium salt of N-(2-methyl-5-chlorophenyl)-benzenesulfonamide, is collected and dissolved in 750 ml. of water. The mixture then is cooled in an ice bath, and propyl iodide (170 g.) is added dropwise over a 30 minute period. After stirring for 1 hour at room temperature, the mixture is extracted with ether, and the ethereal extract washed with water, dried over sodium sulfate, and evaporated to dryness on the steam bath. The residue thus obtained is dissolved in 150 ml. of acetic acid and heated under reflux with 350 ml. of concentrated hydrochloric acid for 6 hours. The reaction mixture then is cooled, and after the solution is made basic with sodium hydroxide pellets, it is extracted with ether. The ethereal extract is washed with water, dried over sodium sulfate, and distilled in vacuo to give 5-chloro-2-methyl-N-propylaniline.

*Step B.*—By replacing the 2-methyl-5-propylaniline employed in Example 12, Step A, by an equimolecular quantity of the thus obtained 5-chloro-2-methyl-N-propylaniline, and following substantially the same procedure described in Example 12, Step A, there is obtained 5-chloro-2-methyl-N-propylacetanilide.

*Step C.*—By replacing the 5-chloro-2-methylacetanilide employed in Example 1, Step A, by an equimolecular quantity of the 5-chloro-2-methyl-N-propylacetanilide obtained as described above, and following substantially the same procedures described in Example 1, Steps A and B, there is obtained 2-carboxy-5-chloro-4-sulfamyl-N-propyl-acetanilide which, when hydrolyzed by substantially the same procedure described in Example 1, Step C, is converted to the corresponding 2-carboxy-5-chloro-4-sulfamyl-N-propylaniline. The product thus obtained then is treated with formamide and heated by substantially the same procedure described in Example 1, Step D, to form 7-chloro-1-propyl-6-sulfamyl-4-quinazolone.

EXAMPLE 15

7-fluoro-6-sulfamyl-4-quinazolone

*Step A.*—By replacing the 2-methyl-5-propylaniline employed in Step A, of Example 12, by an equimolecular quantity of 5-fluoro-2-methylaniline and following substantially the same procedure described in Example 12, Step A, there is obtained 5-fluoro-2-methylacetanilide.

*Step B.*—By replacing the 5-chloro-2-methylacetanilide employed in Example 1, Step A, by an equimolecular quantity of 5-fluoro-2-methylacetanilide obtained as described above, and following substantially the same procedures described in Example 1, Steps A and B, there is obtained 2-carboxy-5-fluoro-4-sulfamylacetanilide which then is hydrolyzed by substantially the same procedure described in Example 1, Step C, to form the corresponding 2-carboxy-5-fluoro-4-sulfamylaniline.

*Step C.*—By replacing the 2-carboxy-5-chloro-4-sulfamylaniline employed in Example 1, Step D, by an equimolecular quantity of 2-carboxy-5-fluoro-4-sulfamylaniline obtained as described above, and following substantially the same procedure described in Example 1, Step D, there is obtained 7-fluoro-6-sulfamyl-4-quinazolone.

EXAMPLE 16

6-chloro-7-sulfamyl-4-quinazolone

*Step A.*—4-chloro-2-methylacetanilide-5-sulfonyl chloride (25 g.) is added in portions over five minutes to 100 ml. of 28% ammonium hydroxide cooled in an ice bath. After heating on the steam bath for 1 hour, the mixture is cooled, and the product collected and recrystallized from aqueous alcohol to give 4-chloro-2-methyl-5-sulfamyl-acetanilide.

*Step B.*—The product thus obtained then is oxidized by substantially the same procedure described in Example 1, Step B, to form 2-carboxy-4-chloro-5-sulfamylacetanilide which then is hydrolyzed by substantially the same procedure described in Example 1, Step C, to form the corresponding 2 - carboxy-4-chloro-5-sulfamylaniline. The sulfamylaniline compound thus obtained is treated with formamide and heated by substantially the same procedure described in Example, Step D, to form 6-chloro-7-sulfamyl-4-quinazolone.

EXAMPLE 17

*1-ethyl-7-nitro-6-sulfamyl-4-quinazolone*

By replacing the 5-chloro-2-methylacetanilide employed in Example 1, Step A, by an equimolecular quantity of 2-carboxy-5-nitro-N-ethylaniline and following substantially the same procedure described in Example 1, Step A, there is obtained 2-carboxy-5-nitro-4-sulfamyl-N-ethylaniline which then is treated with formamide and heated by substantially the same procedure described in Example 1, Step D, yielding 1-ethyl-7-nitro-6-sulfamyl-4-quinazolone.

EXAMPLE 18

*7-chloro-2,3-di-n-propyl-6-sulfamyl-4-quinazolone*

*Step A.*—A solution of 5 g. of 5-chloro-2-methylaniline in a mixture of 10 ml. of butyric anhydride and 10 ml. of benzene is allowed to stand at room temperature for one hour. After cooling in an ice bath, the crystalline product is collected and crystallized from benzene-hexane to give 5-chloro-2-methyl-N-butyrylaniline.

*Step B.*—By replacing the 5-chloro-2-methylacetanilide employed in Step A, of Example 1, by an equimolecular quantity of the 5-chloro-2-methyl-N-butyrylaniline obtained as described above, and following substantially the same procedures described in Steps A and B of Example 1, there is obtained 2-carboxy-5-chloro-4-sulfamyl-N-butyrylaniline.

*Step C.*—By replacing the 2-carboxy-5-chloro-4-sulfamylacetanilide employed in Example 2, Step A, by an equimolecular quantity of the 2-carboxy-5-chloro-4-sulfamyl-N-butyrylaniline obtained as described above, and following substantially the same procedure as described in Example 2, Step A, there is obtained 2-butyrylamino-4-chloro-5-sulfamylbenzoyl chloride.

*Step D.*—A mixture of 5 g. of the thus obtained product and 50 ml. of 40% alcoholic propylamine in a glass-stoppered bottle is shaken for 5–8 hours at room temperature. The solution then is concentrated to dryness in vacuo and the residue crystallized from alcohol-water yielding 5-chloro-2-N-propylcarbamyl-4-sulfamyl-N-butyrylaniline.

*Step E.*—Ring closure of the thus obtained compound is effected by substantially the same method as described in Example 2, Step B, yielding 7-chloro-2,3-di-n-propyl-6-sulfamyl-4-quinazolone.

EXAMPLE 19

*7-chloro-3-ethyl-6-sulfamyl-2-undecyl-4-quinazolone*

*Step A.*—5-chloro-2-methylaniline, 5 g., is dissolved in a mixture of 10 ml. of lauroyl chloride and 10 ml. of benzene and heated briefly on the steam bath. The reaction mixture then is allowed to cool to room temperature and the solid product thus formed collected on the filter. After crystallization from a mixture of benzene-hexane, 5-chloro-2-methyl-N-lauroylaniline is obtained.

*Step B.*—The 5-chloro-2-methyl-N-lauroylaniline is chlorosulfonated and then amidated by substantially the same procedure described in Example 1, Step A, and the 5-chloro-2-methyl-4-sulfamyl-N-lauroylaniline thus obtained is oxidized by the process described in Example 1, Step B, to the corresponding 2-carboxy-5-chloro-4-sulfamyl-N-lauroylaniline.

*Step C.*—By replacing the 2-carboxy-5-chloro-4-sulfamylacetanilide employed in Step A, of Example 2, by an equimolecular quantity of the 2-carboxy-5-chloro-4-sulfamyl-N-lauroylaniline obtained as described above, and following substantially the same procedures described in Example 2, Steps A and B, there is obtained 7-chloro-3-ethyl-6-sulfamyl-2-undecyl-4-quinazolone.

EXAMPLE 20

*7-chloro-3-ethyl-2-phenyl-6-sulfamyl-4-quinazolone*

By replacing the lauroyl chloride employed in Example 19, by an equal quantity of benzoyl chloride and following substantially the same procedures described in Example 19, Steps A through C, there is obtained 7-chloro-3-ethyl-2-phenyl-6-sulfamyl-4-quinazolone.

EXAMPLE 21

*7-chloro-6-sulfamyl-4-quinazolone*

*Step A.*—A mixture of 10 g. of 2-carboxy-5-chloro-4-sulfamylaniline (obtained as described in Example 1, Steps A through C), 75 ml. of ethyl chlorocarbonate and 75 ml. of dioxane is heated under reflux for 48–65 hours. After cooling in an ice bath, the solid is separated by filtration and recrystallized from a dimethylformamide methanol mixture to give 4-chloro-5-sulfamylisatoic anhydride, M.P. 293° C. (dec.).

*Analysis.*—Calculated for $C_8H_5ClN_2O_5S$: C, 34.73; H, 1.82; N, 10.13. Found: C, 35.10; H, 2.05; N, 10.18.

The filtrate from the reaction mixture is concentrated to dryness in vacuo and the residue crystallized from alcohol to give (2-carbethoxy-5-chloro-4-sulfamylphenyl)urethane, M.P. 219–221° C.

*Analysis.*—Calculated for $C_{12}H_{15}ClN_2O_6S$: C, 41.09; H, 4.31; N, 7.99. Found: C, 41.37; H, 4.14; N, 7.95.

*Step B.*—4-chloro-5-sulfamylisatoic anhydride (4.5 g.) is dissolved in 25 ml. of cold 28% ammonium hydroxide and allowed to stand at room temperature for thirty minutes. The mixture then is heated on the steam bath for 30 minutes, cooled, and the solid collected on the filter. Recrystallization from aqueous alcohol gives 2-carbamyl-5-chloro-4-sulfamylaniline, M.P. 277–278° C. (dec.).

*Analysis.*—Calculated for $C_7H_8ClN_3O_3S$: C, 33.67; H, 3.23; N, 16.83. Found: C, 33.95; H, 3.15; N, 16.80.

The filtrate from the reaction mixture is acidified and the solid collected on the filter and recrystallized from a dimethylformamide-water mixture to give (2-carboxy-5-chloro-4-sulfamylphenyl)urea, M.P. 218° C. (dec.).

*Analysis.*—Calculated for $C_8H_8ClN_3O_5S$: C, 32.72; H, 2.75; N, 14.31. Found: C, 33.05; H, 2.86; N, 14.31.

*Step C.*—A mixture of 6.25 g. of 2-carbamyl-5-chloro-4-sulfamylaniline and 25 ml. of ethyl orthoformate is heated at 120–130° C. for 1 hour in an open flask to permit distillation of ethanol formed during the reaction. The mixture is concentrated to dryness in vacuo and the residue crystallized from aqueous alcohol to give 7-chloro-6-sulfamyl-4-quinazolone, M.P. 314–315° C.

EXAMPLE 22

*Sodium salt of 7-chloro-6-sulfamyl-4-quinazolone*

7 - chloro - 6 - sulfamyl-4-quinazolone, obtained as described in Example 1, is dissolved in alcoholic sodium hydroxide and the solvent then evaporated in vacuo yielding the sodium salt of 7-chloro-6-sulfamyl-4-quinazolone.

EXAMPLE 23

*Compressed tablet comprising 0.5 g. active ingredient*

|  | G. |
|---|---|
| 7-chloro-6-sulfamyl-4-quinazolone | 500.0 |
| Starch paste 12½%, 100 cc., allow | 12.5 |
|  | 512.5 |
| Starch, U.S.P. corn | 25.0 |
| Magnesium stearate | 5.5 |
|  | 543.0 |

The 7-chloro-6-sulfamyl-4-quinazolone is granulated with the starch paste and while moist passed through a No. 14 screen, dried at 45° C. for 20 hours and then passed 3 times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended after which the granulation is compressed into tablets using 14/32" flat, bevelled, scored punch having a thickness of 0.205±0.005" yielding 1,000 tablets, each weighing 0.543 gram and having a hardness of 6 kgms. measured by the Monsanto Chemical Company tablet hardness tester apparatus, and a disintegration time of 5 minutes when tested on the U.S.P. tablet disintegrating apparatus (U.S. Pharmacopeia, 15th edition, page 937).

Tablets prepared as described above are suitable for oral administration at a dosage regimen individualized for each patient by his physician.

While the above examples describe the preparation of certain illustrative compounds illustrated by the structure in column 1, and a specific dosage form suitable for administering the novel compounds of this invention in human therapy and certain methods suitable for making the 4-quinazolones of this invention, it is to be understood that the invention is not to be limited by these examples or by the specific reaction conditions described for the preparation of the compounds or by the specific ingredients included in the pharmaceutical preparation but is understood to embrace variations and modifications falling within the scope of the appended claims.

What is claimed is:

1. A 4-quinazolone selected from the group consisting of compounds having one of the following general structures

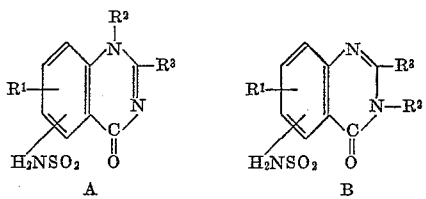

and

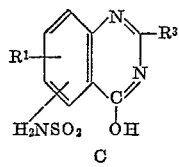

alkali metal salts and alkaline earth metal salts thereof, wherein $R^1$ is selected from the group consisting of hydrogen, halogen, lower alkyl, lower alkoxy, nitro, and amino radicals; $R^2$ is selected from the group consisting of hydrogen and lower alkyl radicals; $R_3$ is selected from the group consisting of hydrogen, lower alkyl, and phenyl radicals.

2. A 4-quinazolone compound having one of the general structures

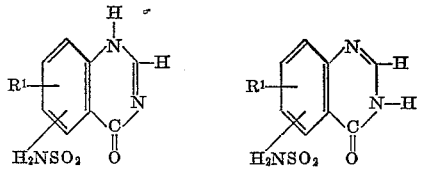

and

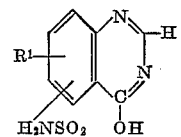

wherein $R^1$ is a halogen.

3. A 4-quinazolone compound having one of the general structures

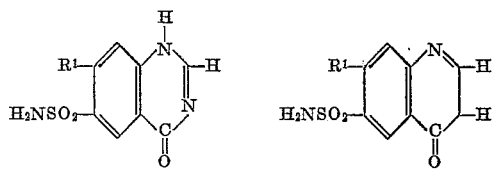

and

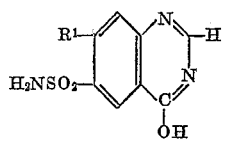

wherein $R^1$ is a halogen.

4. 7-chloro-6-sulfamyl-4-quinazolone.
5. 7-nitro-6-sulfamyl-4-quinazolone.

References Cited in the file of this patent

UNITED STATES PATENTS 2,439,386    Guenther et al.    Apr. 13, 1948

FOREIGN PATENTS 535,449    Canada    Jan. 8, 1957